March 6, 1945.    H. A. SHOLL, JR    2,370,755

LIQUID SEAL AND FLOW GAUGE

Filed Dec. 26, 1942

*INVENTOR.*
HAROLD A. SHOLL JR.

BY

ATTORNEY.

Patented Mar. 6, 1945

2,370,755

UNITED STATES PATENT OFFICE 2,370,755

LIQUID SEAL AND FLOW GAUGE

Harold A. Sholl, Jr., Philadelphia, Pa., assignor to The Brown Instrument Company, Philadelphia, Pa., a corporation of Pennsylvania Application December 26, 1942, Serial No. 470,153

5 Claims. (Cl. 73—211)

The present invention relates to control systems and in particular is directed to a liquid seal and flow gauge that may be used in connection with a gas analyzing apparatus. In systems of the type contemplated herein, a sample of the gas to be analyzed is drawn through suitable cleaning and drying devices to a gas analysis device. From the latter it is passed through a sealing chamber and exhausted to the atmosphere or returned to the process from which it was extracted. The purpose of the sealing chamber is to prevent a backward flow of air or gas through the analyzing apparatus as well as to prevent the entrance of moisture thereto. In systems of this type it is desirable to provide some type of flow gauge to indicate if there is a flow of the gas to be analyzed therethrough, and the amount of this flow.

It is an object of the present invention to provide a device that will act as a combination liquid seal and flow gauge which is simple in construction and operation. It is a further object of the invention to provide a liquid flow seal in which the liquid cannot be forced back into the analyzing apparatus even though there is an abnormal reverse flow of gas through the system.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Figure 1:
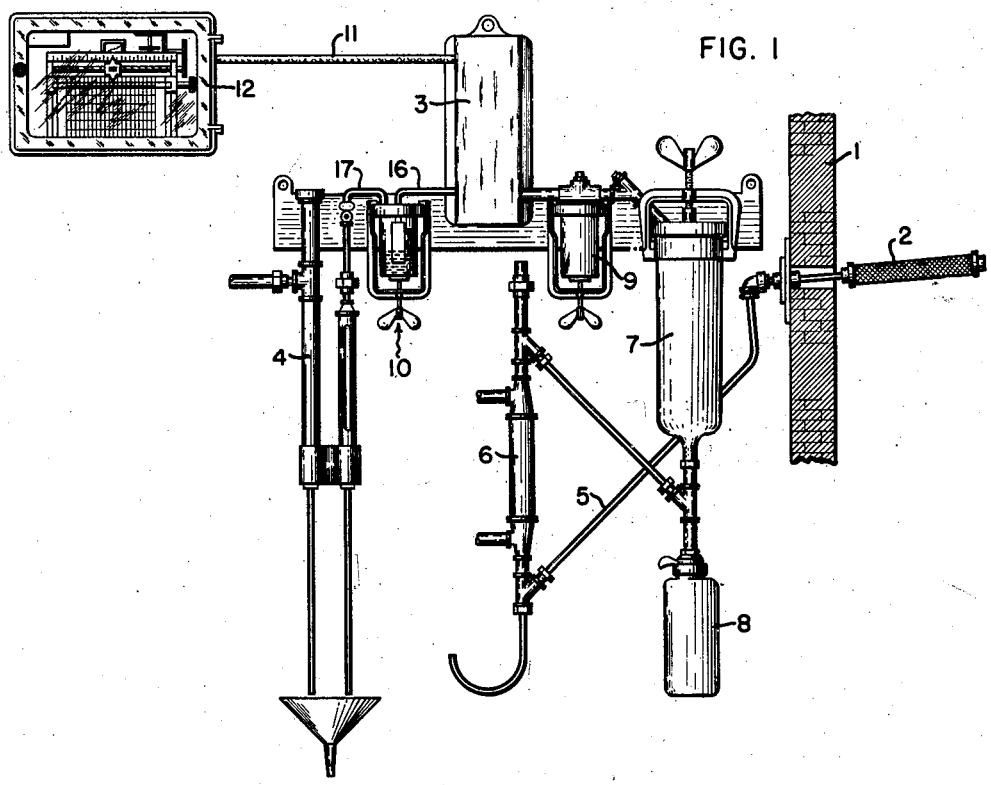
Fig. 1 shows the component parts of a gas analyzing system.
Figure 2:
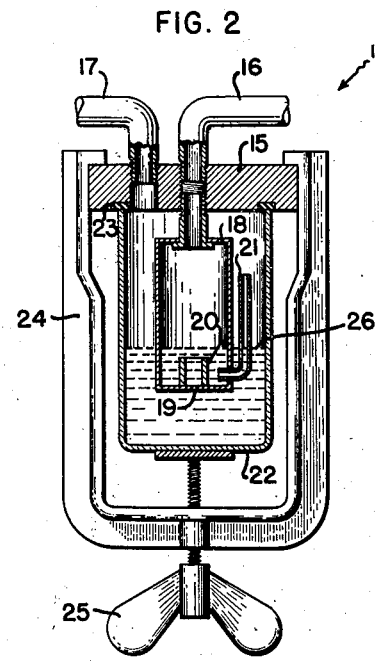
Fig. 2 is a view of the liquid seal and flow gauge of my invention.

Referring first to Figure 1, there is shown at 1 a section of a furnace, the atmosphere of which is to be analyzed to determine, for example, the carbon dioxide content of the hydrogen content thereof. To this end, a sampling tube 2 projects into the furnace through an opening that is provided in one of its walls, and gas is drawn through this tube to a gas analyzing cell 3 by means of an aspirator 4. On passing to the cell from the furnace the gas must be conditioned and for this purpose various accessories are provided in its path. As the gas passes from the tube 2 it is directed by a pipe 5 first through a condenser 6 that serves to condense most of the moisture, the condensate carrying with it the large particles of dirt that may be entrained in the gas. The gas next passes to a dryer 7 that may be filled with calcium chloride or other moisture absorbing material. The brine from this dryer falls into a drip well 8 from which it may be removed from time to time. Between the dryer and the cell 3, there is provided a secondary filter 9 which takes out the remaining moisture and dirt in the gas. After the gas passes through the test cell and before it reaches the aspirator 4 it goes through a liquid seal and a flow gauge 10, located between the two, that serves to prevent the return of the gas through the cell and which serves to give an indication of the amount of gas flowing through the system. The present invention is concerned more particularly with the construction of this combination seal and gauge and with its use in a gas analyzing system of the type herein disclosed. The analyzing cell is connected electrically by means of a suitable cable 11 with a recording or indicating mechanism 12 upon which a record of the analysis of the gas is made.

The flow gauge 10 consists of a frame 15 which has formed in it an inlet opening that is connected by pipe 16 to the cell 3 and is provided with an outlet opening to which the pipe 17, that extends between the gauge 10 and the aspirator 4, is connected. The frame has suspended from it in a suitable manner a gas chamber 18 which may be made of some transparent material such as glass or which may be made of metal. This chamber has an orifice 19 formed in its lower end, and the orifice is surrounded by a retaining collar 20 that extends upwardly into the chamber. A manometer tube 21 is formed as shown, and is located in the lower part of the chamber 18 with its lower end below the upper edge of the retaining collar 20. The gas chamber 18 and the parts carried thereby are surrounded by a glass jar 22 which forms a second chamber and is held in engagement with a rubber or other suitable gasket 23 on the frame 15 by means of a bail 24 and a thumb screw 25. The arrangement is such that the bent over ends on the bail bear against projections on the frame 15 and the thumb screw mounted in the lower portion of the bail serves to force the jar 22 upwardly into engagement with the washer 23 to form an air-tight connection between the two. The jar 22 is filled with a suitable liquid, preferably glycerine, to a level above the upper edge of the retaining collar 20 as shown in the drawing at 26. It is noted that the lower end of the manometer tube 21 is located in what amounts to a small reservoir located between the collar 20 and the wall of chamber 18.

In the operation of the device, as the test gas is drawn through the system by the aspirator 4, it will pass through the flow gauge 10. After entering through pipe 16 to chamber 18 the gas will force the liquid down inside the collar 20 and pass through the orifice 19 to bubble up through the liquid in the jar 22 to be exhausted. The liquid between the retaining collar 20 and the wall of the chamber forms a reservoir to supply the manometer tube 21. As the gas bubbles through the orifice 19 a differential pressure will be created between the interior and the exterior of the chamber 18. This differential pressure, which is high on the interior of the chamber, will force the liquid in the reservoir upwardly into the manometer tube 21 an amount proportional to the flow of gas through the system. The amount that the liquid rises in the manometer 21 is therefore an indication of the flow of the gas, and may be used as a guide in adjusting the aspirator to obtain the proper volume of gas flow and keep the flow constant. When the system is not in operation, the liquid in the unit 10 will rise above the lower end of the tube 21 and the orifice 19 and will therefore, prevent any backward circulation of the gas into the system and into the furnace. This serves two purposes in that it will prevent contamination of the controlled atmosphere of the furnace and it will prevent the entrance of atmospheric moisture in the test cell. Upon an occurrence of an abnormally large flow of gas through the system, all of the liquid may be blown out of the retaining collar 20 and it may be blown out of the manometer tube 21, but upon termination of the flow and reoccurrence of a normal flow the liquid will return to its normal level and cover the retaining collar 20 so that the reservoir formed between the retaining collar 20 and the wall of chamber 18 will again be filled thus covering the lower end of the manometer so that the flow gauge will properly operate to indicate the flow of gas. Upon the occurrence of a backward flow of gas through the system, as may sometimes take place when an abnormal condition occurs, the liquid will merely be blown out of the manometer since that has the smallest static head, but as there will not be sufficient liquid in the manometer to fill up the chamber 18, none of the sealing liquid can pass back through the cell or into the remainder of the system.

It will be seen from the above that I have provided a combination flow gauge and liquid seal that is efficient in operation and simple in its construction. This seal can be used to great advantage in any gas analysis system of the type disclosed herein, or any other system in which a small constant flow of gas is to be maintained and in which it is desired to prevent a backward flow through the system.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. A device of the class described comprising a first member forming a chamber, a second member surrounding said first member and forming with the latter a second chamber, said first member having an orifice formed in it to connect said chambers, a tube open at both ends extending through said first member and having one end in each of said chambers, a liquid in said chambers of a quantity sufficient to close both said orifice and one end of said tube, and a duct leading to each chamber above said liquid.

2. A device of the class described comprising an upstanding container having an inlet passage at its top and an orifice at its bottom, a member surrounding said container, means cooperating with said member to form a chamber surrounding said container, an exhaust passage extending from said chamber, a liquid seal between the interior of said container and said chamber, the arrangement being such that gas flowing into said container will pass through said orifice to said chamber and exhaust therefrom, the gas bubbling through the liquid seal, and means extending between the interior of said container and said chamber to give an indication of the volume of flow between the two.

3. In a device of the class described a pair of concentric members forming a pair of concentric chambers, the inner member being formed with an opening therein to connect the two chambers, a collar surrounding said opening and extending into the inner member to form a reservoir in said member, a tube open at both ends extending through the inner chamber so that one end is in each chamber, the end of the tube in the inner chamber terminating in said reservoir, and a duct leading to each chamber.

4. In a device of the class described, a container having a bottom and a side wall, said bottom wall having an opening therein, an upstanding collar surrounding said opening, and a tube having an open upper and an open lower end, the said lower end extending through the side wall of said container into the same at a point below the topmost portion of said collar, a member enclosing said member and tube, and a duct leading to each of said container and member.

5. A liquid seal and flow gauge comprising a frame having an inlet and an outlet passage therein, a member forming a chamber supported by said frame with said chamber connected to said inlet passage, said member being formed with an opening in a lower wall thereof and being provided with a portion to form a small reservoir therein, a manometer tube having one end extending into said reservoir, a casing extending around the outside of said member and tube and engaging said frame with a pressure tight connection, and a liquid in said casing to a level to fill said reservoir formed in said member.

HAROLD A. SHOLL, Jr.